United States Patent

[11] 3,526,214

[72] Inventor Roy Kamo
Columbus, Indiana
[21] Appl. No. 801,710
[22] Filed Feb. 24, 1969
Continuation-in-part of Ser. No.
685,103, Nov. 22, 1967, now abandoned
and Ser. No. 685,106, Nov. 22, 1967, now
abandoned.
[45] Patented Sept. 1, 1970
[73] Assignee Cummins Engine Company, Inc.
Columbus, Indiana
a corporation of Indiana

[54] COMPRESSION IGNITION ENGINE WITH
COMBUSTION AID
11 Claims, 22 Drawing Figs.
[52] U.S. Cl. .................................................. 123/122,
123/142.5, 123/179
[51] Int. Cl. .................................................. F02m31/00
[50] Field of Search .......................................... 123/179H,
142.5, 122A, 122D, 122G; 60/13, 39.65;
123/119A

[56] References Cited
UNITED STATES PATENTS

| | | | |
|---|---|---|---|
| 1,253,682 | 1/1918 | Good | 123/122(G)UX |
| 1,377,990 | 5/1921 | Good | 123/122(G)UX |
| 1,387,848 | 8/1921 | Good | 123/179(H)UX |
| 2,419,747 | 4/1947 | Wassman | 123/119(A) |
| 2,608,051 | 8/1952 | Nettel | 60/13 |
| 2,633,698 | 4/1953 | Nettel | 60/13 |
| 2,654,991 | 10/1953 | Nettel | 60/13 |
| 2,993,487 | 7/1961 | Konrad et al. | 123/142.5 |
| 3,158,192 | 11/1964 | Mizer | 123/142.5 |
| 3,237,615 | 3/1966 | Daigh | 123/119(A)UX |
| 3,353,520 | 11/1967 | Haag | 123/179(H)UX |
| 3,397,684 | 8/1968 | Scherenberg | 123/142.5X |

Primary Examiner—Laurence M. Goodridge
Attorney—Hibben, Noyes and Bicknell

ABSTRACT: This disclosure deals with a low compression ratio internal combustion engine of the compression-ignition type, including an improved combustion aid for facilitating starting of the engine and for reducing white smoke (unburned fuel in the exhaust) during starting and operation.

The improved combustion aid includes a fuel burner located in the engine air intake. It also includes distributing means to allocate the products of combustion from the fuel burner to the inlet ports of the cylinders, where these products of combustion mix with and heat the primary combustion air passing through the air intake. Such preheating and distributing combined with the temperature increase resulting from compression at the low ratio insures rapid ignition and complete combustion of the injected fuel to effect prompt starting of the engine and early elimination of white smoke.

For starting and operation, the burner may be started and stopped automatically under the control of a thermostat responsive to the temperature of the circulating engine coolant at a point near the engine block.

This disclosure also relates to an improved fuel burner that may be used to start either low compression ratio engines or conventional high compression ratio engines.

COMPRESSION IGNITION ENGINE WITH COMBUSTION AID

CROSS-REFERENCE TO RELATED APPLICATIONS

This application is a continuation-in-part of my pending applications Ser. Nos. 685,103 and 685,106, filed November 22, 1967, both now abandoned.

BACKGROUND OF THE INVENTION

In an internal combustion engine of the compression-ignition or diesel type, the air entering the cylinders in each cycle must be compressed sufficiently to raise the air temperature above the temperature necessary to effect reliable and complete combustion under all normal conditions of service use. This has placed limitations on the minimum compression ratio (cylinder volumes in the down and up positions of the piston) that may be used while insuring reliable starting, smooth idling and the early elimination of white smoke, that is, the unburned fuel vapor which remains suspended in the exhaust gas until a sufficiently high temperature has been attained. Thus, compression ratios of 16 to 1 and above are most commonly employed in conventional engines of the size range intended for on highway vehicle operation at very low ambient temperatures. Such engines have sometimes been equipped with various kinds of heaters burning engine fuel within the air intake to raise the temperature of the intake air through the relatively small range required to insure reliable starting at sub-zero temperatures, the burner being stopped after the starting.

Much effort has been directed particularly in recent years to the development of a diesel engine of the size intended for on highway use and having a low compression ratio of, for example, 12 to 1. With such an engine it is possible to increase the power output or reduce the engine stresses of a diesel for a given size and weight. In a low compression ratio engine, a greater mass of air may be forced into the cylinders by supercharging or turbocharging, and a correspondingly greater amount of fuel may be burned in each cycle without exceeding the permissible peak combustion pressure. Conversely, when less than the maximum permissible air and fuel are injected into the cylinders, lower engine stresses will be encountered and the engine will have a longer life and greater reliability.

A major problem impeding the development of a low compression ratio engine has been the excessive production of white smoke, particularly at starting, idling, and low load operation.

White smoke comprises unburned fuel droplets which escape in the exhaust from the cylinders. It occurs when the temperatures in some portions of the cylinders are insufficient to burn the fuel therein, as for example when an engine is being started and the temperature distribution of the intake air supplied to the cylinders is uneven. White smoke thus differs materially from black smoke, which comprises carbon particles resulting when the compression temperature is adequate to support combustion, but the local oxygen supply is insufficient to oxidize all the carbon in the fuel.

Another problem with low compression ratio engines is that they are more difficult to start than high compression ratio engines. This is due to the difficulty in obtaining a high enough compression temperature to effect ignition of the fuel-air mixture anywhere in the cylinders.

British Pat. No. 772,298 and Lieberherr U.S. Pat. No. 3,257,797, suggest that fuel burning preheaters may be used to supply additional heat for starting of engines with such low compression ratios. However, these preheaters have not successfully coupled starting capability with the early elimination of white smoke.

In an effort to increase specific output, the industry has at great expense directed its efforts toward the perfection of engines having a variable compression ratio piston. This comprises a number of parts shiftable relative to each other in response to pressure changes within the cylinder so as to provide the high compression ratio required for starting, idle and low load operation, and a lower compression ratio during operation of the engine under load. In spite of its apparent acceptance by experts in the field, the variable compression ratio piston has numerous disadvantages and has not yet achieved real commercial success.

SUMMARY OF THE INVENTION

The present invention provides a combustion aid for facilitating starting of a low compression ratio diesel engine and for eliminating white smoke. These benefits are achieved by providing a burner in the air intake of the engine and distributing means mounted in the air intake for distributing hot gases, such as the products of combustion, from the burner to the air intake ports leading to the engine cylinders.

By such efficient utilization and even distribution of the heat developed by the burner, the amount of fuel required to be burned, even in an engine of low compression ratio, is so small that the air drawn into the manifold and each of the cylinders will not be robbed of enough of its oxygen to interfere either with efficient and immediate ignition of the fuel as injected into the cylinders or the rapid elimination of white smoking during the starting.

The invention also resides in the novel construction of a fuel burner to start low compression ratio and high compression ratio engines.

In addition the invention resides in a novel means of automatically starting and stopping a fuel burner.

Figure 11:
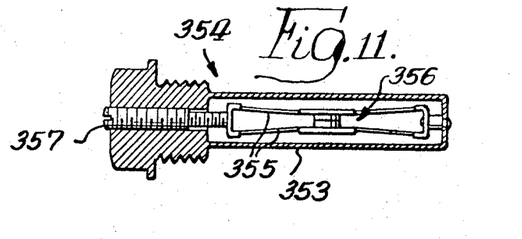
FIG. 11 is a cross-sectional view taken along the line 11—11 of FIG. 10.
Figure 12:
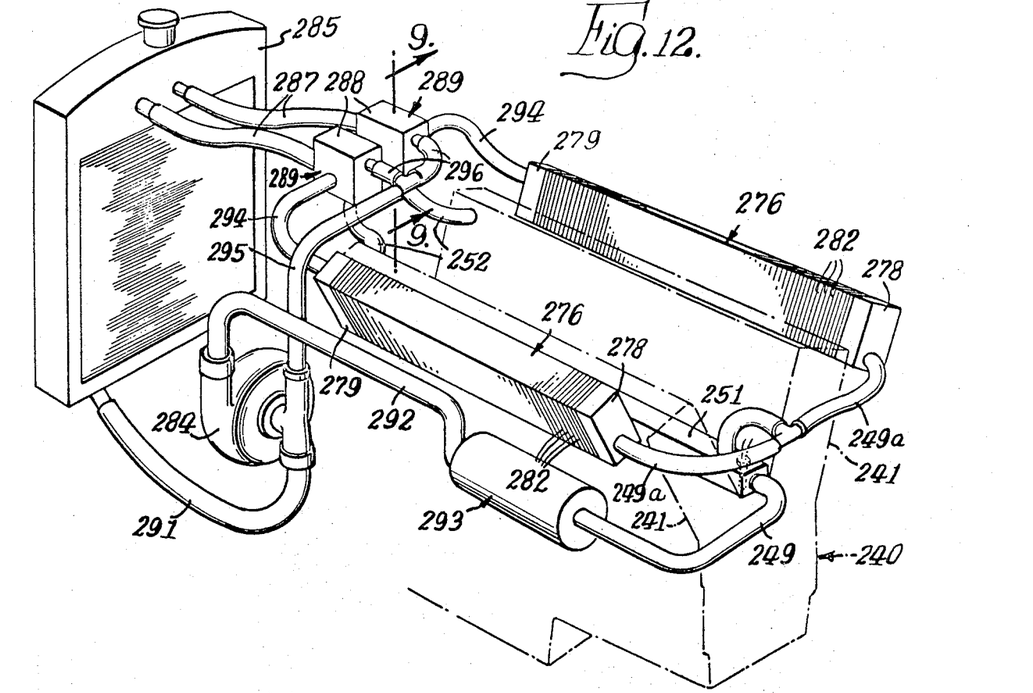
FIG. 12 is a perspective view of the water circulating system of the engine shown in FIG. 1.

While the present invention is applicable to both two-cycle engines and four-cycle engines, a four-cycle diesel engine of the V-type is illustrated and described herein. As shown in FIGS. 1 through 13, the cylinders 241 are arranged in two banks in a block 240 and covered by heads 242 with pistons 243 reciprocable in liners 244 therein by connecting rods 245 journaled on a central and properly counterweighted crankshaft 246. Numerous intercommunicating water passages 247 and 248 (FIGS. 4 and 9) are formed in the block and heads around the cylinders 250 and extend between an inlet conduit 249 (FIG. 12) leading to a manifold 251 on the block and conduits 252 at the outlets of the head passages 248 (FIGS. 9 and 12).

Figure 1:
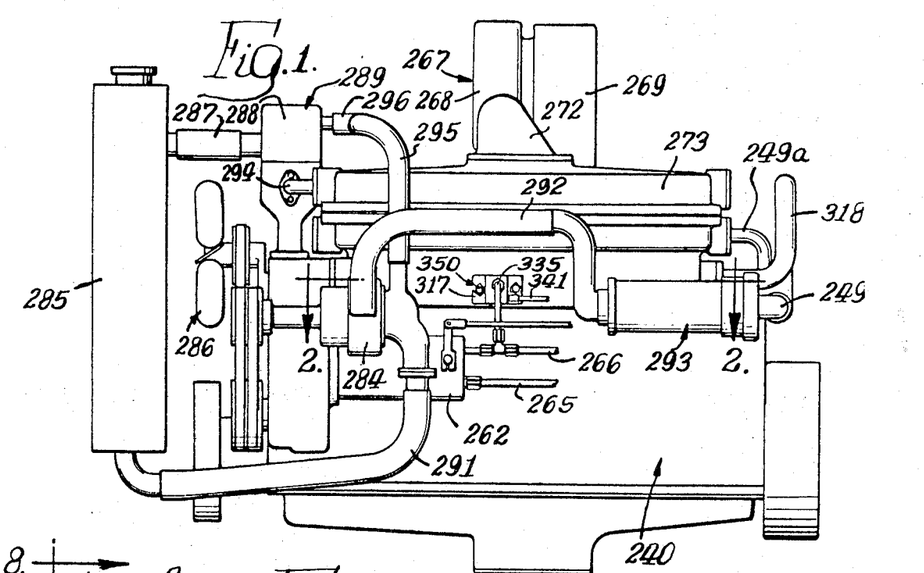
FIG. 1 is a side elevational view showing an engine embodying the invention.
Figures 2, 3:
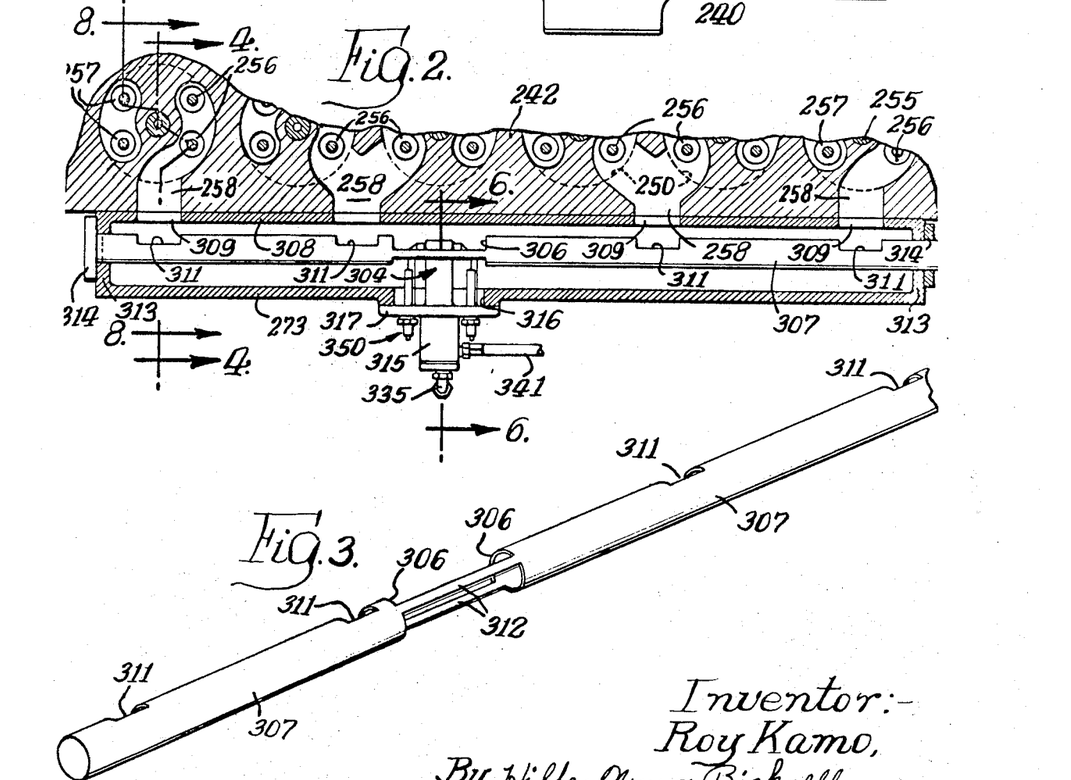
FIG. 2 is a fragmentary sectional view taken along the line 2—2 of FIG. 1.
FIG. 3 is a fragmentary perspective view of a part of a combustion aid of the engine shown in FIG. 1.
Figures 4, 5:
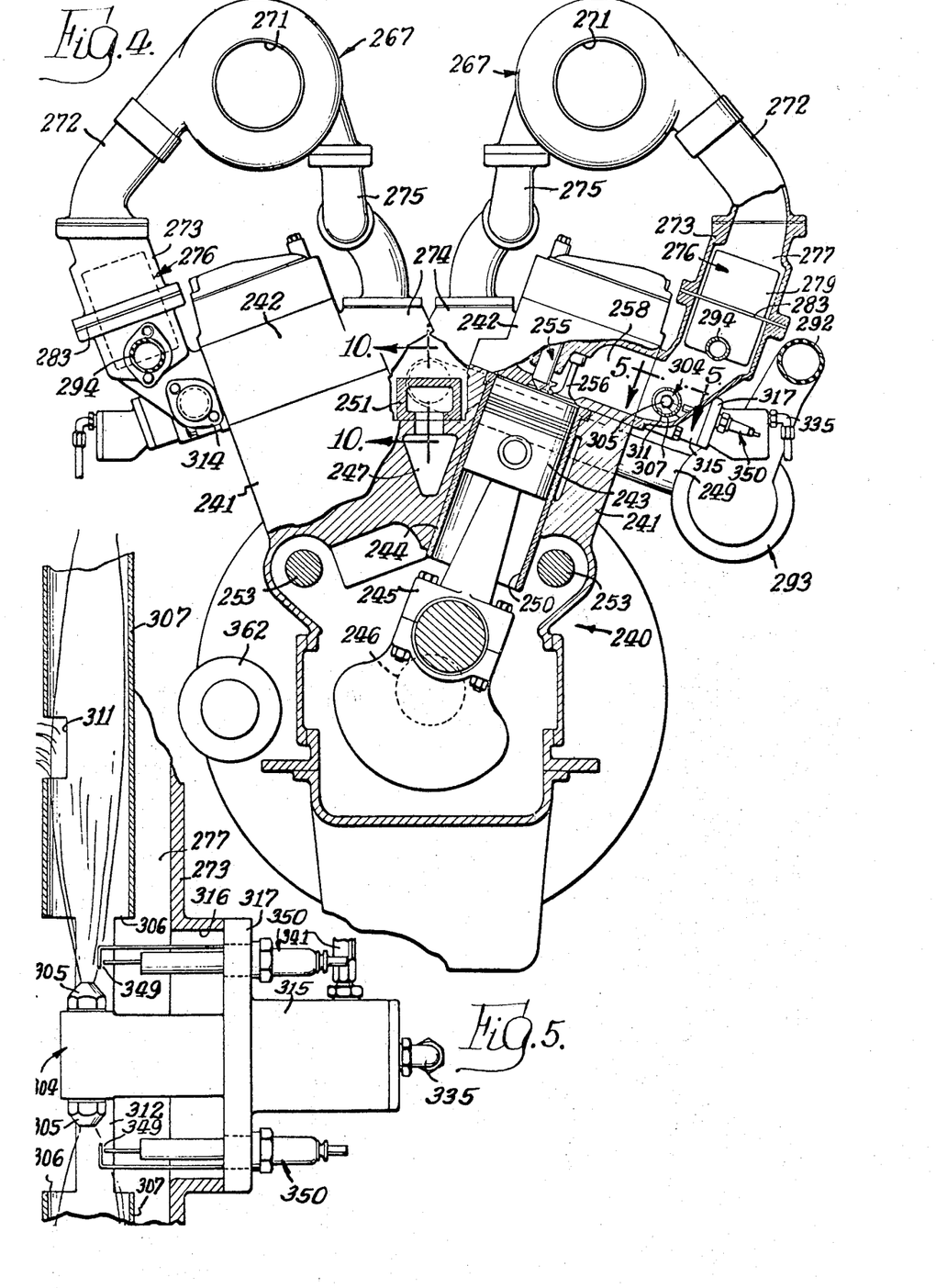
FIG. 4 is a fragmentary cross-sectional view of the engine taken on the line 4—4 of FIG. 2.
FIG. 5 is a fragmentary sectional view taken along the line 5—5 of FIG. 4.

Camshafts 253 (FIG. 4) journaled in the engine block and driven in timed relation with the crankshaft are connected by conventional linkages 254 (FIG. 8) to operate fuel injectors 255, air intake valves 256 and exhaust valves 257 at appropriate times in each engine cycle in accordance with naturally aspirated or turbocharged engines, as the case may be. While the intake valve 256 of a cylinder is open, air is drawn in through a passage 258 into the cylinders as shown in FIGS. 2 and 4. When an exhaust valve is open, exhaust gases are discharged through a port leading to the exhaust manifold 274. In the particular form of the engine illustrated, in each bank of six cylinders 250, indicated in dashed lines in FIG. 2, four intake passages 258 are provided. The passage 258 at each end of the block conducts intake air to only one cylinder, such cylinders being the associated endmost cylinders. Each of the other two innermost passages 258 conducts intake air to two cylinders. As shown in FIG. 2, each of the two innermost passages is in the shape of a Y and intake valves 256 for two adjacent cylinders are located at the ends of the branches of the Y.

Figures 8, 9, 10:
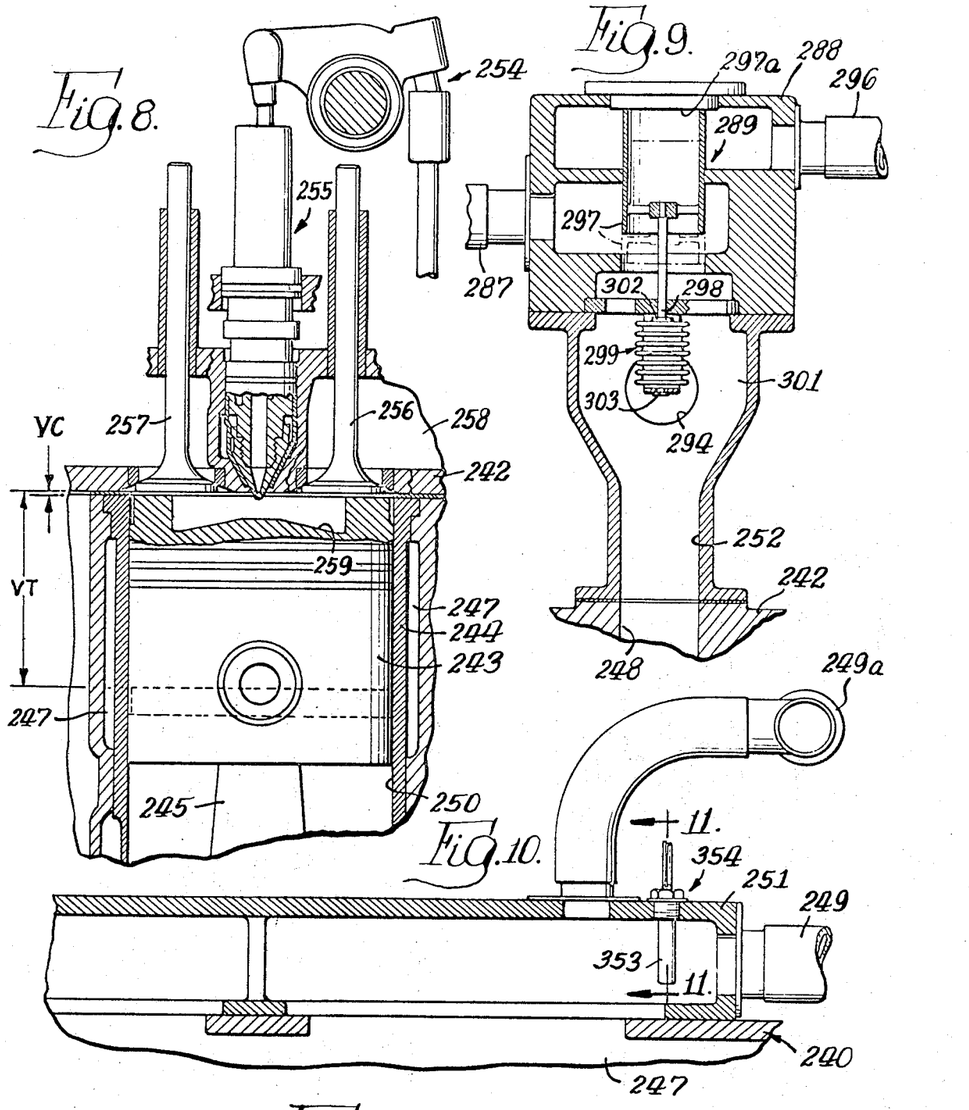
FIG. 8 is an enlarged cross-sectional view taken along the line 8—8 of FIG. 2.
FIG. 9 is a fragmentary cross-sectional view taken along the line 9—9 of FIG. 12.
FIG. 10 is a fragmentary cross-sectional view taken along the line 10—10 of FIG. 4.

The crown of each piston is formed with a central recess indicated by the line 259 in FIG. 8, and the fuel injected into the cylinder is sprayed into this recess. The fuel charge for each cylinder is thus mixed with the air then filling the cylinder, the air having been heated, under normal load conditions, as a result of compression on the upstroke of the piston to a temperature sufficiently high for ignition of the fuel.

The fuel charge injected into the successive cylinders of each bank is derived from a supply tank 261 (FIG. 13) pressurized by an engine driven pump 262 and delivered through a valve 263 opened by energization of a solenoid 264 to the injector supply rails 265. The excess fuel is returned to the pump inlet through a rail 266.

Where, as in the illustrated embodiment, optimum power output for an engine of given size is a prime objective, provision is made for compressing the intake air when the engine is operating under load and cooling the compressed air before it enters the cylinders. Such supercharging is effected by a so-called turbocharger 267, preferably one for each bank of cylinders, comprising a compressor 268 driven by a turbine 269 (FIG. 1) and operating to draw air through openings 271 (FIG. 4) and, after compressing and thereby heating the air, discharging the same through a conduit 272 into the top and at the center of the manifold 273 of the cylinder bank. The turbocharger units may be mounted on top of the engine above the heads of the respective banks of cylinders. The turbine 269 of each turbocharger 267 is driven by exhaust gas passing from and flowing out of the exhaust manifold 274 (FIG. 4) of one bank of cylinders to a conduit 275 and then to and through the turbine. For high power output, it is preferred that each turbocharger have sufficient capacity to boost the pressure by a factor of at least 3 to 1, that is, to nearly 45 psia and, with such a pressure boost, a cooler is preferably provided to attain maximum power output to improve engine efficiency. A turbocharger providing a pressure boost of 2 to 1 may be used with a correspondingly lower power output and, in such instance, a cooler may not be necessary.

In the present instance, the illustrated engine is designed for optimum power output for which purpose the intake air leaving each compressor 267 through the associated conduit 272 is cooled substantially when the engine is operating under load. This is accomplished by a heat exchanger 276, one for each bank of cylinders, extending along the full length of the associated air intake manifold 273 and disposed in the upper parts of the chambers 277 defined thereby. The exchangers (FIGS. 6 and 12) comprise headers 278 and 279 at opposite ends of and communicating with a parallel pipes 281 from which radiate closely spaced rectangular fins 282 slightly smaller than the inlet cross-section of the manifold chamber 277. The exchanger unit is mounted through the medium of a flange 283 (FIG. 4).

Water may be used as the engine cooling medium and circulated through a system (FIGS. 1, 9, and 12) which includes a pump 284 driven from the engine crankshaft and a radiator 285 cooled by a suitable engine drive fan 286 and having inlet conduits 287 communicating with the casings 288 of thermostatic valves 289 (FIGS. 9 and 12). The outlets 252 from the water passages 248 of the heads are connected to the bottoms of the casings 288 as shown in FIG. 9. Some or all of the pumped water may by-pass the radiator through a conduit 295 having branches 296 leading from the casings 288. The radiator outlet extends through a conduit 291 to the inlet of the pump which forces water through a conduit 292, an oil cooler 293 and the conduit 249 into the water manifold 251 of the engine. From the inlet end of this manifold water may flow through the conduits 249a to the respective headers 278 through tubes 281 of the respective heat exchangers 276 and through pipes 294.

Alternatively and preferably for some engines, the tubes 281 of each heat exchanger 276 and the water manifold 251 may be connected in series between the pipe 249 and the casings 288. Thus, instead of the water flow from the pump being divided and passed part through the tubes 281 and the remainder through the engine jackets, all of the water may flow first through the heat exchanger tubes and then through the engine jackets.

Distribution of the water flow through the radiator and the by-pass conduit 295 is determined by the valves 289 (FIG. 9) herein disposed within the casings 288 and movable back and forth with changes in the temperature of the water at the junctions of the heads and exchanger outlets 252 and 294 and the by-pass 295. Herein, each valve comprises a sleeve 297 coupled at 298 to the movable end 302 of a thermostatic bellows 299 disposed within a chamber 301 and anchored at 303. The chamber communicates with the head and exchanger outlets so that the actuator moves the sleeve between the positions shown in full and in phantom in FIG. 9 when the sensed temperature is above and below a range predetermined by the construction and setting of the actuator 299. With this arrangement and when the temperature of the flowing water is above the upper limit of the range, for example 195 deg. F., the sleeve end 297 will be positioned against a seat 297a as shown in full in FIG. 9 thus closing the inlet to the by-pass conduit 295 and fully opening the passage between the inlets 252 and 294 and the radiator inlet 287. All of the water circulated by the pump thus flows from the engine jackets and the heat exchangers and through the radiator so as to be subjected to maximum cooling.

When the engine is cold, the thermostatic actuator 299 senses a temperature below the selected range, for example 180 deg. F., and moves the sleeve downwardly to the position shown in phantom in FIG. 9, the radiator inlet passages 287 are closed and all of the circulated water flows through the by-pass to the pump and then through the exchanger coils and engine jackets back to the thermostat casing 288. The radiator is then inactive and does not withdraw any heat from the circulating water. At temperatures of the water intermediate the limit values mentioned above, the valve sleeve will be disposed in corresponding positions between those shown in full and in phantom and the circulated water flow will be divided between the radiator and the by-pass 295.

From the foregoing, it will be apparent that the thermostatic valves 289 operate continuously and automatically to maintain maximum water flow through the radiator and therefore maximum cooling when needed during operation of the engine under full load. But, when the engine is cold or the heat of combustion within the cylinders during starting or idling can best be utilized for maintaining smooth engine operation at the low compression ratio, the radiator is completely disabled or partially disabled by partial opening of the valve 289 by the thermostatic actuator 299. Thus, for a substantial period after starting, the heat absorbed from the engine by the circulating water is utilized through the medium of the heat exchangers 276 to assist in heating the manifold air in the continued operation of the engine.

The engine is designed for operation at a fixed compression ratio of 12 to 1 substantially lower than the ratio now used in most commercial engines. That is to say, the ratio of total cylinder volume Vt (FIG. 8), with the piston down, to the clearance volume Vc with the piston up, is relatively low.

It is difficult to rapidly start and reduce white smoke from a low compression ratio engine except at very high ambient temperatures. The temperature resulting from compression within the cylinders at lower ambient temperatures are not high enough to effect complete burning. This, of course, is because the heat added to the air by compression within the cylinders, minus the heat lost to the surrounding cold metal, results in an air temperature which is below the temperature required for complete combustion.

The utilization of a low compression ratio in a multicylinder diesel engine to provide substantial power output or prolonged service life is made possible in accordance with the present invention by burning engine fuel at an accurately metered rate within the manifold chamber 277 and directing the flow of the developed heat to and distributing the same between the engine cylinders in a novel manner such as to heat, quickly and consistently under all starting conditions, all of the admitted air to a temperature sufficiently high to produce, within each cylinder, a compression temperature which is sufficiently above the theoretical temperature required by the fuel to insure rapid ignition and which is sufficiently uniform throughout the air charge to insure rapid elimination of white smoke, or unburned fuel in the exhaust. The fuel burning in the manifold chamber is started instantaneously with cranking and at a rate sufficient to attain within the cylinders quickly and without fail under all expected conditions of cold starting and operation a compression temperature well above that necessary for rapid ignition and the early elimination of white smoke.

Burners 304, supplied with the engine fuel at a proper flow rate and constructed and mounted in the manner shown in FIGS. 2, 3, 5 to 7 and 13 enable the engine as above described, to be started in a few seconds, for example 10 seconds, of cranking and at the same time insuring the disappearance of white smoke in the exhaust within no more than 40 seconds even at an ambient temperature as low as −25 deg. F.

The burner 304 for one bank of cylinders comprises two nozzles 305 from which a mixture of compressed air and atomized fuel is discharged into the ends 306 of tubes 307 disposed within the manifold chamber 277 below the heat exchanger 276 and disposed adjacent and extending along the inner wall 308 of the manifold chamber close to ports 309 therein leading to the intake passages 258. The tubes are a compound of metal and are formed with side openings 311 opposite each of the ports 309 and passages 258. The ends 306 of the tubes 307 are joined by bars 312 (See FIG. 3). The other ends of the tubes project through the end walls 313 of the manifold and are located by fittings 314.

The nozzles are threaded into opposite sides of a casting 315 at the inner end thereof, the casting projecting through a hole 316 in the outer wall of the manifold and in between the bars 312. The casting is formed intermediate its ends with a flange 317 screw clamped against this wall. Herein, the tubes at one end of the block communciate with each other through a pipe 318 (FIG. 13) to always equalize the pressures between the two manifolds.

Each nozzle 305 comprises a cup 319 threaded at 321 into the side of the casting 315 and having a hole 322 alined with an orifice 323 at the end of a sleeve 324 disposed within and threaded at 325 into the cup. A plug 326 pressed into the outer end of the sleeve is formed with a passage 327 terminating in the orifice 323 which is spaced a short distance from the inner end of the hole 322. A frusto-conical surface 328 on the end of the plug cooperates with the inner surface of the cup to form an annular air passage 329 which converges toward the hole. The plug 326 may be replaced by one having an orifice 323 of a different size corresponding to the burner output that may be required for another engine.

Fuel for each of the two burners is supplied to the inner ends of the sleeves 324 through a passage 331 in the casting 315 and a chamber 332 between seal rings 333 around the sleeves 324. The outer end of the passage is disposed below the level of fuel maintained in a closed tank 334 (FIG. 6) clamped against the outer wall of the manifold. The pressure in the tank is equal at all times to the prevailing manifold air pressure by virtue of a passage 330 (FIG. 6) establishing continuous communication between the two.

Figures 6, 7:
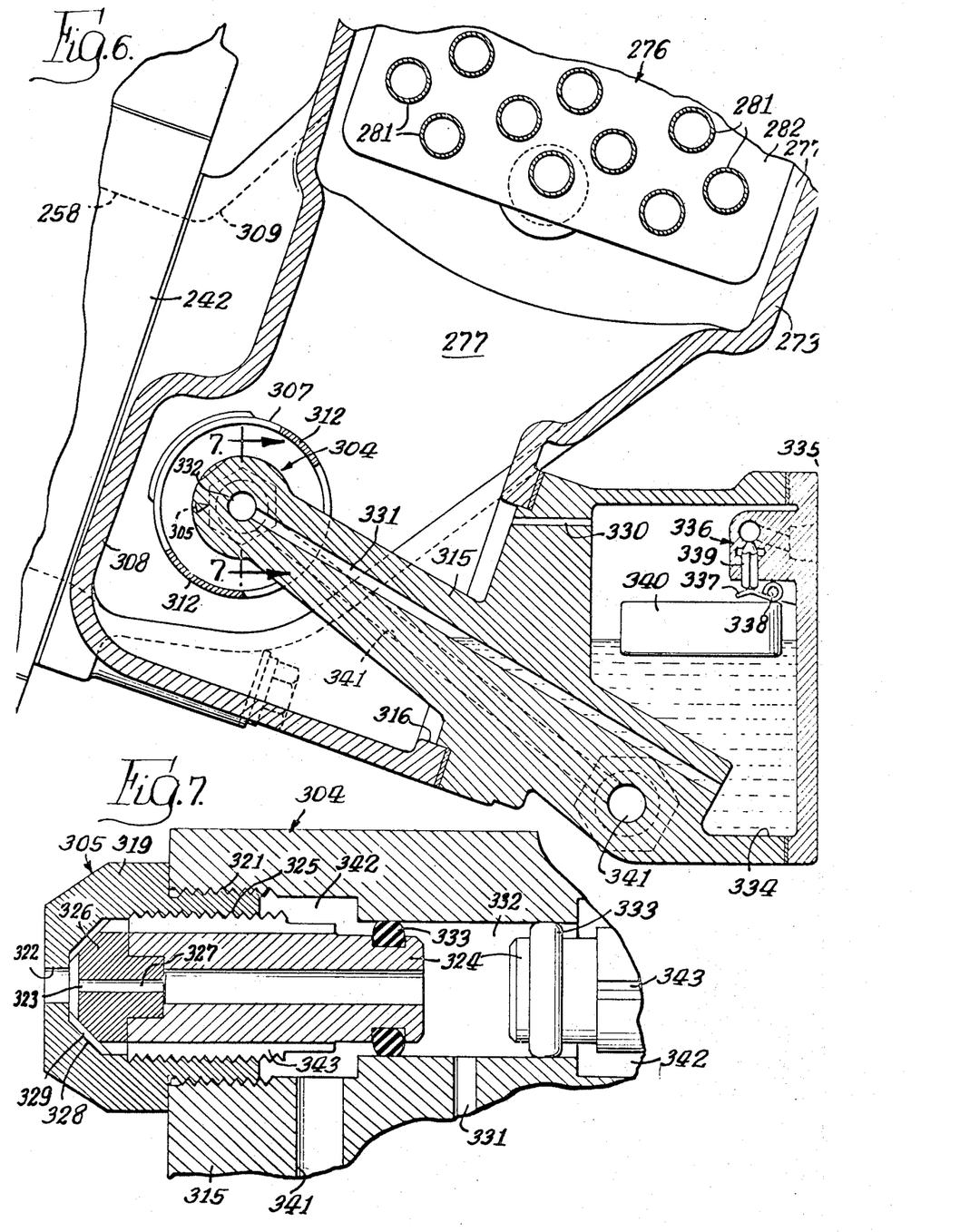
FIG. 6 is a fragmentary cross-sectional view taken along the line 6—6 of FIG. 2.
FIG. 7 is a fragmentary cross-sectional view taken along the line 7—7 of FIG. 6.
Figure 13:
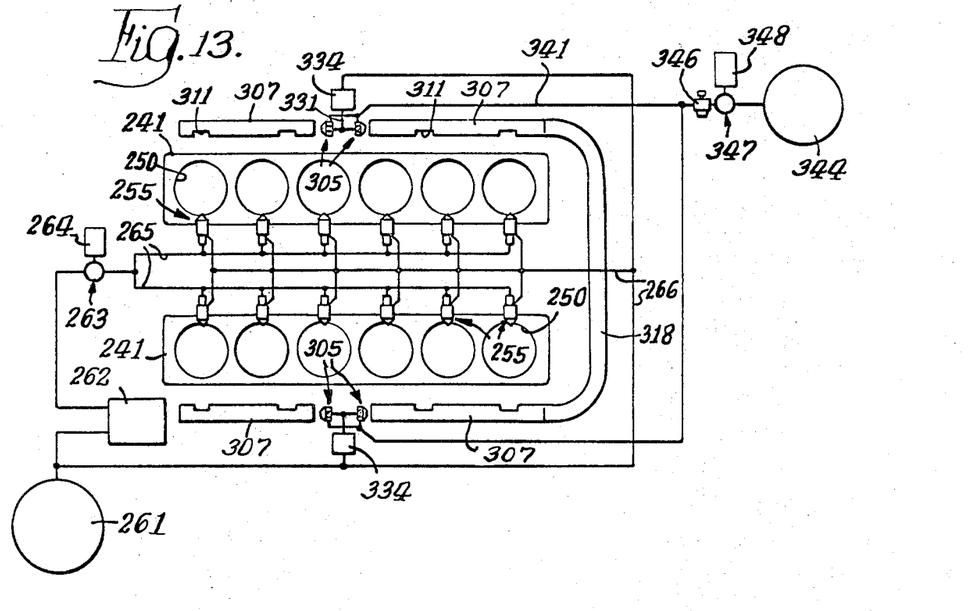
FIG. 13 is a schematic view of the fuel and air supply system for a fuel burner for the engine shown in FIG. 1.

The level of the fuel within the tank is maintained constant by any well-known means. Herein, fuel under some pressure in the return line 266 (FIG. 13 is supplied to the tank through a pipe 335 and a valve 336 having a member 339 bearing against an arm 337 on a float 340 pivoted at 338 and resting on the fuel within the tank. Fuel is admitted to the tank when the valve is open but the flow is interrupted when, by a rise in level, the member 339 becomes seated as shown in FIG. 6.

Air for aspirating fuel outwardly through the orifice 323 and atomizing such fuel is delivered through respective burners to passages 341 terminating in chambers 342 within the casting 315 and around the sleeves 324 and communicating through grooves 343 along the sleeves and plugs 326 with the converging passages 329. Air is supplied from any suitable source at a pressure which is sufficiently higher than the manifold pressure to produce an adequate flow for aspirating fuel at the proper rate through the orifice 323, for properly atomizing such fuel, and for supplying a proper proportion of the air needed for combustion of such fuel.

Because of the high speed atomizing air, the nozzle 305 provides excellent atomization of the fuel, is not prone to clogging, and operates at relatively cool temperatures.

Air for the manifold burner may be derived from various sources such, for example, as a compressor driven by a separate motor when the burners are to be operated and adjusted to deliver air at the desired pressure. Or, in the case of transport vehicles, the air may be supplied from the tank 344 (FIG. 13) that supplies the vehicle air brakes. In such a case, a suitable automatic reducing valve 346 (FIG. 13) of well-known construction is used and adjusted to provide the desired constant pressure within the passage 332 when a valve 347 is opened by energization of a solenoid 348.

With the construction above described and while compressed air is being supplied, fuel will be aspirated through the orifice 323 at a rate determined by the orifice size, the air pressure, the difference in the level between the tank 334 and the nozzle 305 and the pressure within the manifold chamber 277. The latter may be disregarded since, at times when the burners are to be active, such as during starting or idling, the turbocharger is not producing any appreciable increase in the manifold pressure. The constant pressure air flow is thus utilized not only to atomize the burner fuel but also to aspirate the fuel from the constant level tank and to meter the fuel supply accurately in proportion to the rate of air flow. Thus, the heat of the burner herein shown is always constant.

Ignition of the atomized fuel-air mixture discharged from each burner nozzle in a flaring pattern is effected by sparks spanning the gap 349 of a spark plug 350 mounted on the flange 317 with the gap positioned near the burner nozzle and in the path of the atomized mixture. The sparking is produced in the usual way as by a conventional ignition coil and a vibrator.

The formation of the heater flame within a tube of the above construction and of smaller cross-section than the manifold while extending the tube along the intake ports 258 in close proximity thereto is advantageous for several reasons. The flame is confined to a zone close to the intake ports so that the flaming mixture is delivered quickly and uniformly into the ports as each intake valve is opened. During starting, the flame does not come into contact with the walls of the manifold chamber 277 thus minimizing heat losses to these parts. Also, the imperforate top of the tube insulates the burner flame and shields the heat exchanger 276 from the heat developed in the tube and reduces the radiation thereto so as to reduce the spacing needed to avoid any danger of damaging the exchanger. The imperforate top of the tube also reduces the danger that the flame will be blown out by the stream of intake air flowing through the manifold.

Figure 14:
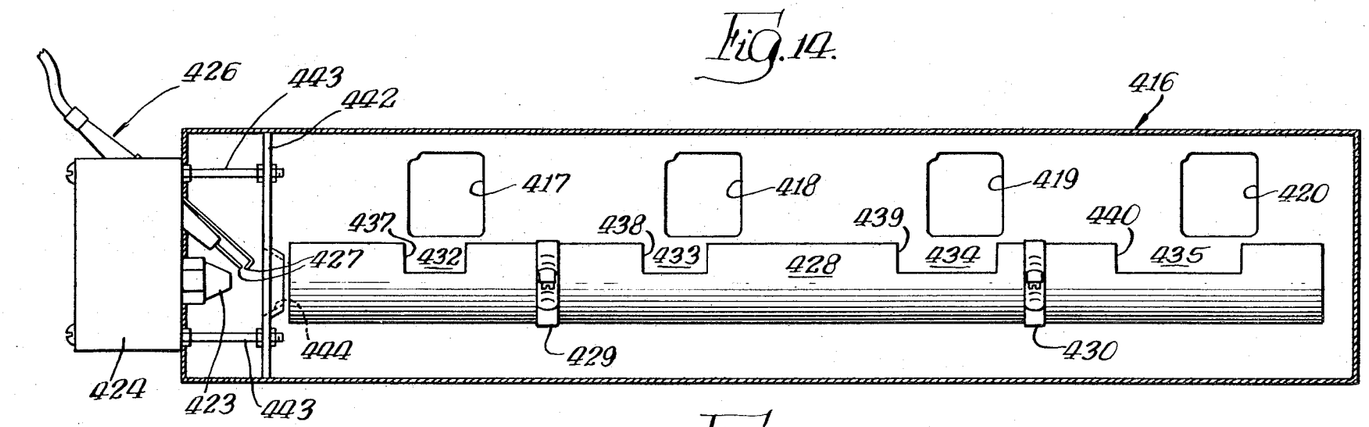
FIG. 14 is a fragmentary top elevational view showing a preferred form of a combustion aid embodying the invention.
Figure 15:
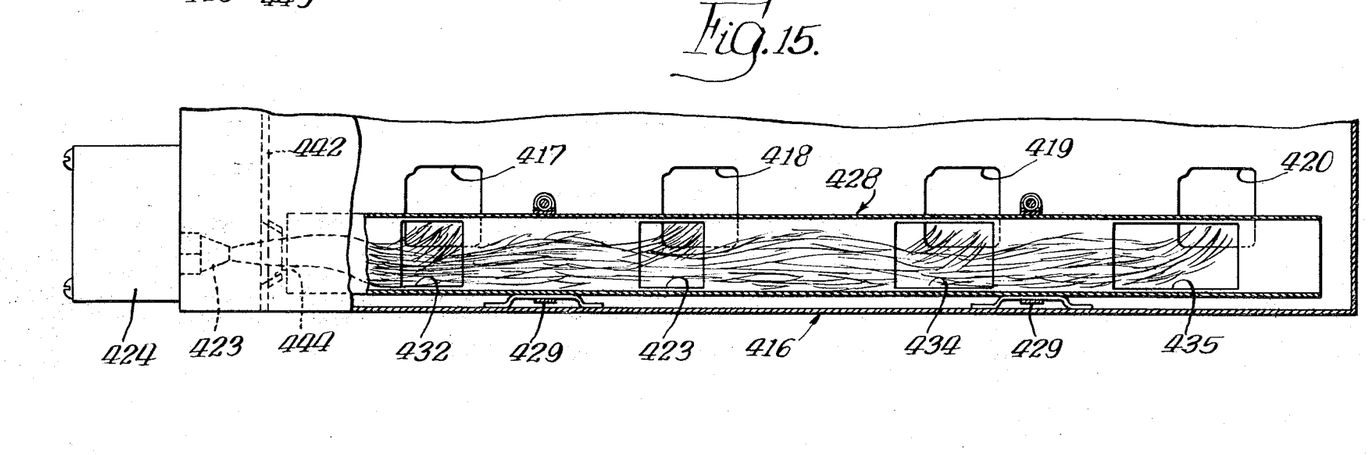
FIG. 15 is a fragmentary side elevational view of the combustion aid shown in FIG. 14.

FIGS. 14 and 15 show a preferred form of combustion aid and one adapted for use in a V—8 engine in which the air intake ports and the intake manifolds are located within the V of the engine block and supplied with air through inlets disposed intermediate the ends of the manifolds and the banks of cylinders. In such an engine, the center lines of the cylinders of each bank may be at a 45° angle from a vertical line. FIG. 14 is a horizontal sectional view through the manifold of such an engine, looking downwardly from a plane immediately above the burner, and FIG. 15 is a vertical sectional view looking toward the burner from a vertical plane adjacent the burner. Mounted within the manifold 416 is a burner comprising a nozzle 423 of the character previously described mounted on a holder block 424 secured to one end of wall of the manifold and having the air and fuel passages formed therein. The holder 424 also supports a spark plug 426 having its points 427 located adjacent the nozzle 423 in order to ignite a fuel-air mixture issuing from the nozzle 423.

The aid further includes a heat distributor comprising an open ended metal tube 428 which is secured to the wall of the manifold 416 by a pair of straps 429 and 430 and is positioned in axial alignment with and adjacent the nozzle 423, so that an air-gas mixture issuing from the nozzle enters the adjacent end of the burner tube 428. The latter extends along and is disposed adjacent the intake ports 417 to 420 and has side openings 432 to 435 which are respectively located adjacent and opposite the intake ports 417 to 420.

In order to improve quick starting of the engine and early elimination of white smoke it is desirable to uniformly distribute the heat from the burner to the respective intake ports. For this purpose, the tube 428 is mounted closely adjacent to and extends across the ports 417 to 420, and the openings 432 through 435 of the tube 428 are sized and located relative to the intake ports 417 to 420 so that all of the intake ports receive substantially equal amounts of the heat delivered by the burner. This is accomplished mainly by progressively increasing the areas of the openings 432 through 435 with increasing distance from the nozzle 423. Thus, the opening 432 which is closest to the nozzle 423 is relatively small and the leading edge 437 of the opening 432 is approximately in line with the leading side of the port 417. The next opening 433 is slightly larger than the opening 432 and its leading edge 438 is a short distance nearer the nozzle 423 than the leading edge of the port 418. The next opening 434 is larger than the other two openings 432 and 433, and its leading edge 439 is a greater distance nearer the nozzle 423 than the adjacent edge of the port 419. Finally, the opening 435 is larger than any of the other three openings 432, 433 and 434, and its leading edge 440 is advanced even nearer the nozzle 423 than the leading edge of the port 420. Thus, the gradually increasing sizes of the openings with increasing distances from the nozzle results in a uniform distribution of burner heat to the various cylinders. The flaming mixture from the nozzle 423 sweeps upwardly as seen in FIG. 15 and toward the right, and the advance of the leading edges 437 to 440 relative to the ports 417 to 420 permits the hot gases in the form of flame and heated air to sweep into the ports 417 to 420.

In addition to the air supplied to the nozzle 423 to aspirate the desired constant flow therethrough and effect proper atomization, it is important that the burner receive additional air in order to effect complete combustion of the burner fuel. This may be accomplished, for example, by a plate 442 supported on the burner holder 424 by bolts 443, extends across the manifold a short distance beyond the end of the nozzle 423 and close to the inlet end of the burner tube 428. The plate 442 has a central hole 444 axially aligned with the nozzle 423. A spray of fuel and air discharges from the nozzle, through the opening 444 and into the end of the burner tube. The edge of the hole 444 may be tapered inwardly and toward the tube 428 to form a venturi. By ejector action, enough air is induced to flow from the surrounding manifold space into the burner tube to provide for substantially complete combustion of all of the atomized fuel. The resulting flame and products of combustion flow through the tube 428 and laterally out of the tube through the holes 432—435 and into the intake ports 417 to 420.

A relatively small part of the air flowing into the manifold through the hole 444 enters the burner tube. The remainder of the intake air flows transversely across and around the burner tube 428, becomes heated by contact with the burner tube 428 as it approaches the intake ports, and becomes mixed with the products of combustion leaving the openings 432 to 435 as illustrated in FIG. 15. As shown in FIG. 15, the burner tube 428 is positioned somewhat below the level of the ports 417 to 420 so that the tube does not block the downward flow of intake air into the intake ports 417 through 420.

Figure 16:
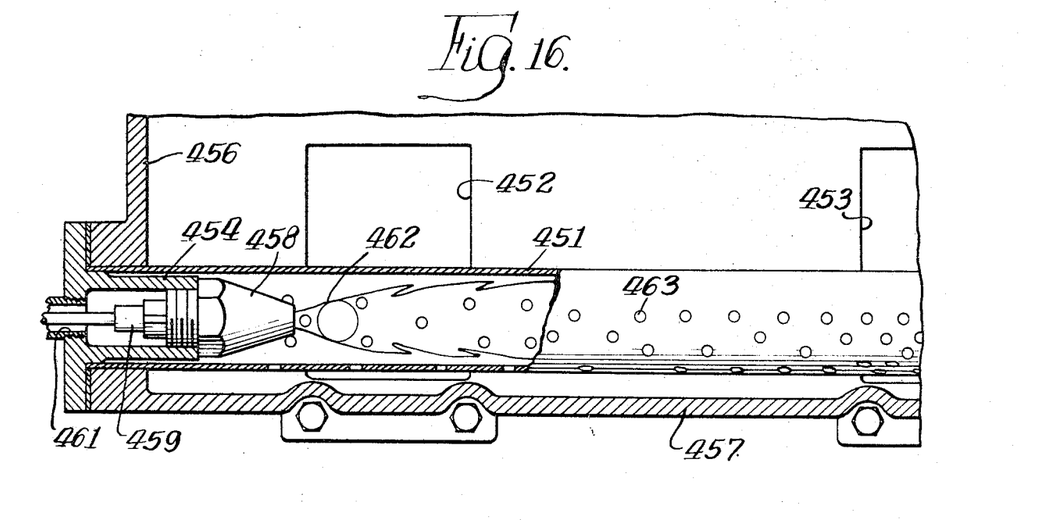
FIG. 16 shows an alternate form of a combustion aid.

FIG. 16 illustrates a combustion aid embodying the invention, including a single tube 451 which extends adjacent all of the cylinder intake ports 452 and 453 along one side of the engine. The tube 451 is supported from opposite ends on fittings 454 (only one shown) which project from opposite end walls 456 of the manifold 457. A nozzle 458 of the same construction as the nozzles previously described is threaded into the fitting 454 and supplied with fuel through a pipe 459 and with atomizing air through a surrounding passage 461 so as to project a spray of fuel into the tube 451. A spark plug 462 is provided to ignite the fuel. The tube 451 has a plurality of relatively small holes 463 formed therein throughout its length. The perforated area of the tube 451 consists of approximately two-thirds of its circumference, approximately one-third of the tube circumference on the upstream side thereof being imperforate in order to prevent the flame from being blown out by the flow of intake air and to protect an intercooler (not shown) from the burner heat. The portion of the holes 463 adjacent the nozzle 458 and adjacent the upstream side of the tube 451 permit a portion of the intake air to flow into the tube 451 and mix with the sprayed fuel, and the portion of the holes 463 on the downstream side of the tube permit the flame and products of combustion to flow out of the tube and into the intake ports.

Additional or larger holes could be provided adjacent the nozzle 458 if additional intake air is needed for complete combustion. To obtain an even distribution of heat to the various cylinders, the total area of the holes 463 per unit length of the tube is gradually increased with increasing distance from the nozzle 458. While this could be accomplished by having a uniform number of holes and gradually increasing the size of the holes, in the present instance it is accomplished by keeping the hole size uniform and increasing the number of holes with distance from the nozzle 458. Thus, the combustion aid shown in FIG. 16 evenly distributes the burner heat similar to the operation of the aid shown in FIGS. 14 and 15.

In another of its aspects, the present invention contemplates stopping the manifold burner automatically at the proper time after each starting of the engine and again turning the burner on whenever, as during a period of idling or low load operation, the heat of combustion is insufficient to maintain a compression temperature sufficiently high to prevent rough operation of the engine or the reappearance of white smoke in the exhaust. Since it is not practical to measure the actual compression temperature within the engine cylinders, an equivalent or indirect and corresponding temperature measurement is made at a point in the overall system where all of the several factors affecting the actual compression temperature are combined so that a single temperature reflects and corresponds quite closely to the changing value of the compression temperature. Among such factors that prevail during idling are the heat of combustion, the residual heat held in the engine parts and in the cooling system, compression ratio and the prevailing ambient temperature.

I have discovered that the temperature of the water continuously circulating either in the radiator or by-pass paths above described or in both of such paths is influenced by all of the above factors, particularly at a point in the flow path of the water through the circuit including the by-pass 295 when the radiator is inactivated by the action of the thermostat. The sensing element 353 of a thermostat 354 for measuring such temperature changes may, as shown in FIGS. 10 and 12, be disposed at the inlet to the water manifold 251 which communicates with the engine and intercooler passages.

The thermostat 354 may be of the construction (FIG. 11) sold by Fenwall Incorporated under the trade designation MC 177D and including the sensing element 353 in the form of a shell which expands and contracts with changes in the water temperature. Non-expanding struts 355 disposed within and anchored to opposite ends of the shell carry contacts, forming a switch 356 which operates with a snap action and is closed as shown in FIG. 11 when the water temperature falls below a predetermined value, for example 180 deg. F., and is opened when a somewhat higher temperature, for example 195 deg. F., is sensed. By adjusting a screw 357, the temperature range of the thermostat may be varied in accordance with the requirements for a given engine.

Figure 17:
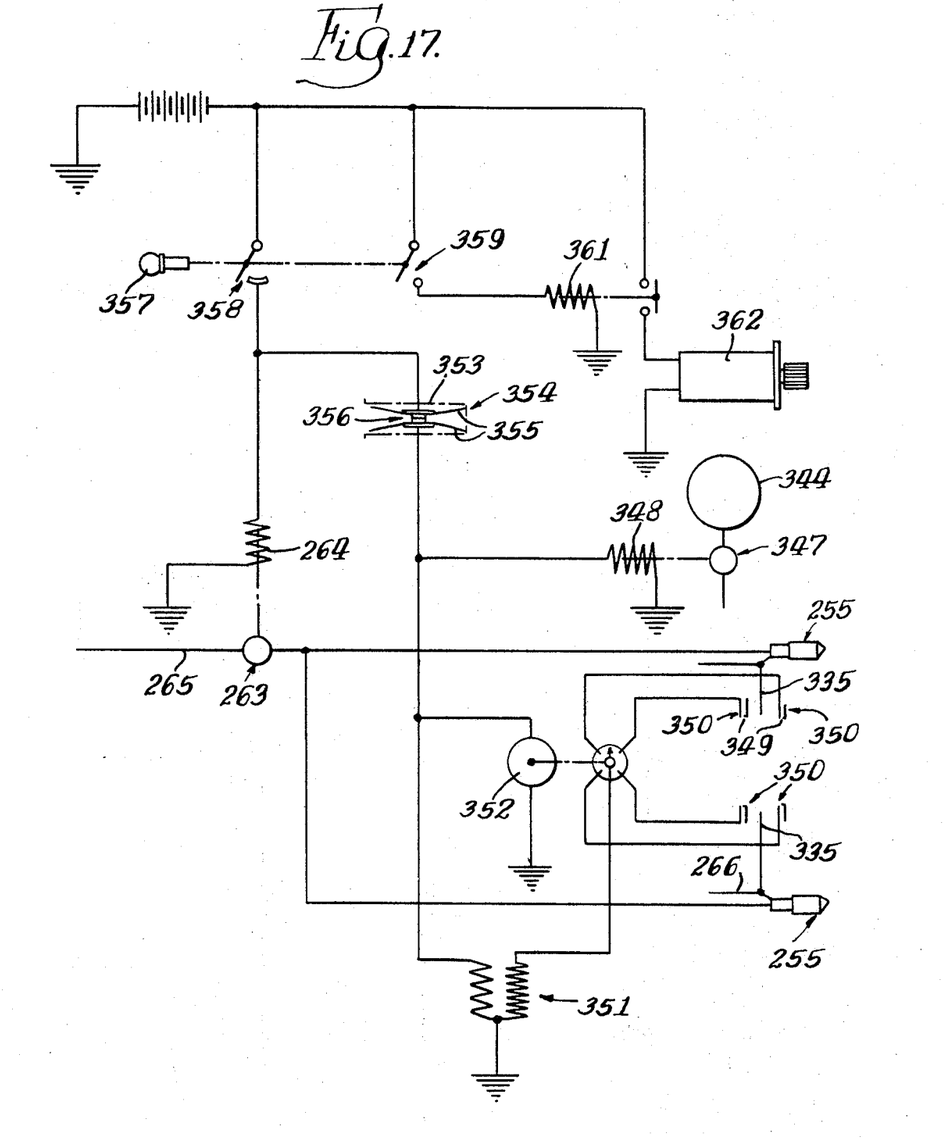
FIG. 17 shows schematically a wiring diagram for the fuel burner of the engine shown in FIG. 1.

The starting and stopping of the burners 304 in conjunction with the starting, stopping, idling and full load operations of the engine above described may be controlled by the circuitry shown in FIG. 17. When the engine, and therefore the coolant, is cold, the thermostat switch 356 will be closed and valve sleeve 297 will be disposed as shown in phantom in FIG. 9 thus disconnecting the radiator and fully opening the by-pass 295. To start the engine, a key 357 is turned to first close a switch 358 and energize the solenoid 264 for opening the valve 263 interposed in the line 265 leading from the fuel pump 262 to the injectors 255. Further turning of the key closes a switch 359 which energizes a solenoid 361 to start the cranking motor 362. Closure of the switch 358 enables current flow through the then closed switch 356 and starts the distributor motor 352, activates the ignition coil unit 351, and energizes a solenoid 348 for opening the valve 347 to admit air from the pressure source 344 to the burner nozzles 305. Thus, immediately with the start of the cranking, the combustible sprays of fuel and air are discharged from the nozzles 305 and ignited to form flames directed into the ends of the tubes 307 and along the latter as illustrated in FIG. 5 to provide the proper amount of heat for immediate ignition in the manner detailed below.

As soon as the engine starts, the key 357 is released to allow the switch 359 to open and stop the cranking motor 362. The switch 358 remains closed so as to continue the energization of the fuel pump solenoid 264, and also energization of the air valve solenoid 348, the distributor motor 352, and the ignition coil 351 through the then closed thermostat switch 356. Operation of the burner is thus continued.

As the engine is warming up and taking on load, some of the engine heat is transferred through the cylinder walls and absorbed by the water being circulated through the by-pass circuit above described. Thus, after a short warm-up period, the temperature of the water will be raised enough to cause opening of the thermostat switch 356 which results in deenergization of the solenoid 348, the motor 352 and the ignition coil 351 thus interrupting the air flow and shutting the burner off automatically.

As the loading of the engine increases, the engine will become hot and the thermostatic valves 289 will be opened to allow an increasing amount of the pumped water to circulate through the radiator. At full load, the valves will become positioned as shown in full lines in FIG. 9 and all of the circulating water will flow through the radiator.

When the engine is being operated at low levels as during idling, the heat of combustion transferred to the water being circulated through and cooled by the radiator may not be sufficient to maintain the water temperature above the temperature at which the thermostatic switch 356 remains open. The switch thus closes and effects restarting the burners 304 the same as during starting of the engine as above described. Additional heat is thus supplied to the intake air so as to restore the compression temperature necessary for insuring smooth idling and preventing white smoking. Then, when the engine speed and load are again increased, the switch 356 will open and the burners will be shut off in the manner above described.

Figure 18:
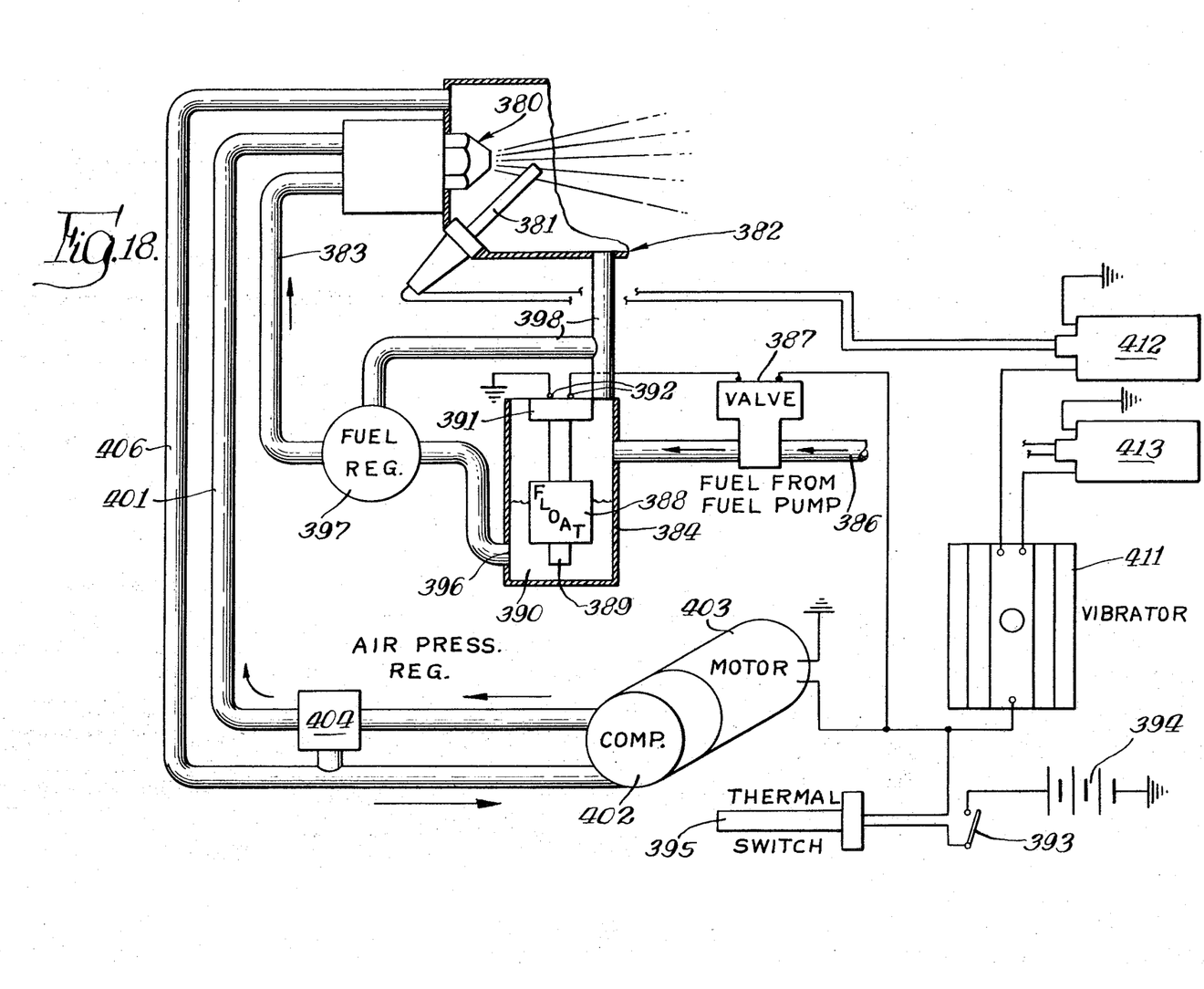
FIG. 18 is an alternate form of a fuel supply apparatus and control for a fuel burner.

FIG. 18 illustrates diagrammatically an alternate fuel supply and control system which may be used with a combustion aid embodying the invention. In this form a nozzle 380 of the type shown in FIG. 7 and a spark plug 381 mounted within the interior of an air intake manifold 382. Fuel is supplied to the nozzle 380 by a conduit 383 and a fuel supply tank 384 which in turn receives fuel from a conduit 386. The latter conduit 386 may be connected to receive fuel from the main fuel pump (not shown) of the engine.

The flow of fuel from the fuel pump to the nozzel 380 is controlled from the tank 384 by a valve 387, and a regulator 397. The valve 387 is connected in the conduit 386 between the tank 384 and the main fuel pump, the valve 387 being solenoid actuated and being closed only when the solenoid is energized. Energization and deenergization of the solenoid to open and close the valve 387 is controlled by a float 388 within the tank 384. The float 388 is connected to and supports the post 389 which in turns supports a contact closure plate 391. A pair of normally open contacts 392 are mounted at the upper end of the tank 384, the contacts 392 being connected in series with the solenoid of the valve 387. The circuit further includes a normally open, manually operable switch 393, a battery 394, and a thermostatically actuated switch 395. As in the case of the switch 356 (FIGS. 10 and 11) above described, the thermostatic actuator for this switch is arranged to respond to a temperature at a point in the overall system which reflects and follows approximately changes in the temperature of the cylinder walls of the engine. As described above, a preferred location of the thermostatic element is near the point where the cooling water leaves the jackets of the engine. The arrangement is such that the switch is normally closed when the engine is cold or the sensed temperature is below a predetermined value below which it is desirable to preheat the air taken into the cylinders.

When the engine start switch 393 is manually closed and the plate 391 establishes an electrical connection between the contacts 392, current flows from the battery 394 through the switches 393 and 395 and the solenoid of the valve 387, thereby energizing the solenoid valve 387 and closing the conduit 386 to fuel flow. The contacts 392 are of course closed only when the plate 391 is moved upwardly by the float 388.

The conduit 383 is connected at 396 to the lower end of the tank 384 below the level of the fuel 390 in the tank 384, and during operation of the burner, air flowing out of the nozzle 380 draws fuel out of the nozzle by an aspirating action. The fuel flow rate to the nozzle 380 is a function of the difference between the nozzle suction pressure and the fuel supply pressure. To keep the fuel flow rate constant, it is also necessary to maintain the above pressure difference at a constant value. Therefore, it is necessary to make the fuel supply pressure a function of the manifold 382 pressure, and this is accomplished by a vent conduit 398, and by the regulator 397 connected in the line 383. The vent conduit 398 runs to both the interior of the tank 384 and to the regulator 397, and the regulator 397 maintains the fuel pressure to the nozzle at a constant relation to the manifold pressure.

Air flow to the nozzle 380 is through another conduit 401 connected to the outlet of a compressor 402. The compressor 402 is driven by a DC motor 403 which is also connected through the switches 393 and 395 to be energized by the battery 394. An air pressure regulator valve 404 is connected in the conduit 401 between the nozzle 380 and the compressor 402 in order to regulate the pressure of the air to the nozzle 380. Since the air issuing from the nozzle 380 must be at a certain positive pressure relative to the pressure within the intake manifold 382, the air intake to the compressor 402 is through an intake conduit 406 and from the intake manifold 382. The air pressure regulator valve 404 is also connected to the conduit 406 and thus maintains the pressure in the conduit 401 at a certain value relative to the pressure within the manifold 382.

The circuit for the spark plug 381 comprises the previously mentioned switches 393 and 395 and the battery 394. In addition, the circuit comprises a vibrator 411 and an ignition coil 412. A second coil 413 is also provided, this coil also being connected to the battery 394 and to the vibrator 411 and adapted to be connected to the spark plug (not shown) of a burner for another bank of cylinders.

Considering the operation of the system shown in FIG. 18, with the engine cold and the switch 393 open, the switch 395 is closed, the fuel pump connected to the conduit 386 is not being driven, the valve 387 is not energized, and the spark plug 381 is not energized. To start the engine, the manually operable switch 393 is closed, such closure causing current flow from the battery 394 through the switches 393 and 395 and through the motor 403. Energization of the motor causes air to be pumped from the air intake manifold 382, through the conduit 406 to the intake of the compressor 402, through the air pressure regulator valve 404, through the conduit 401, and out of the nozzle 380. Such air flow out of the nozzle 380 draws fuel out of the nozzle from the conduit 383 and the tank 384, by an aspirating action. If the fuel level in the tank 384 is initially relatively low, the plate 391 is spaced downwardly from the contacts 392 and the contacts 392 are therefore open. The valve 387 is thus deenergized and permits fuel to flow through the conduit 386 to the tank 384. When the fuel in the tank has risen somewhat, the contacts 392 are closed by the plate 391 and the valve 387 is energized, thus cutting off the flow of fuel to the tank 384.

The air issuing from the nozzle 380 atomizes and mixes with the fuel to form a combustible mixture. At the same time, the vibrator 411 and the coil 412 energize the spark plug 381 and thus ignite the mixture as previously explained. After the engine has started and warmed to a predetermined temperature, the thermal switch 395 opens and deenergizes both the motor 403 and the spark plug 381, thereby turning the burner off. Of course, as previously explained, if the temperature of the engine subsequently falls for any reason, as during idling, the thermal switch 395 again closes and turns the burner back on.

Figure 19:
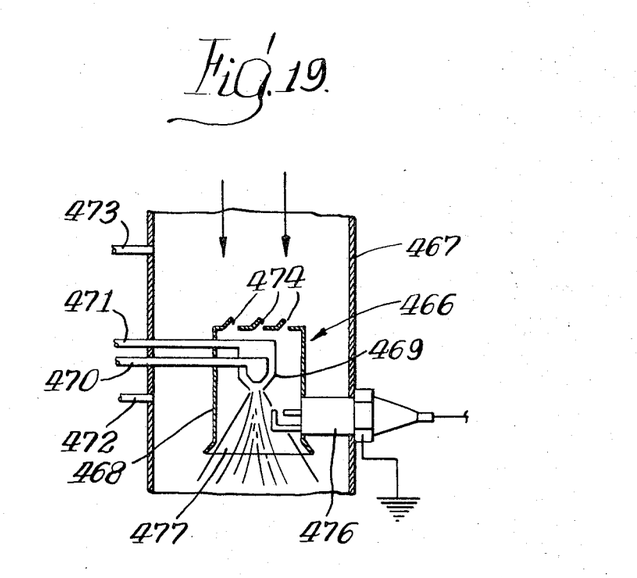
FIG. 19 shows a fuel burner embodying the invention.

FIG. 19 illustrates a manifold burner 466 in an intake air passage 467 leading to the intake ports of a bank of cylinders (not shown). The burner 466 comprises a cup-shaped enclosure 468 mounted within the passage 467 close to the air intake ports, with its open end facing in the downstream direction. Fuel is supplied to a fuel atomizing nozzle 469 (similar to the nozzles previously described) mounted within the interior of the enclosure 468, by a fuel line 470. The line 470 extends through the wall of the passage 467 and carries fuel from a fuel supply such as a constant level fuel chamber, such as tank 384 (FIG. 18). Also extending through the wall of the passage 467 is an air line 471 which extends from a compressed air supply, such as air compressor 402 (FIG. 18), to the nozzle 469. Conduits 472 and 473 are preferably provided to connect the passage 467 to the fuel and air supplies in order to equalize the pressure therebetween. Inlet openings or vents 474 are formed in the upstream side of the enclosure 468 to permit a portion of the intake air flowing through the passages 467 to enter the enclosure 468 and mix with the fuel and air leaving the nozzle 469. The nozzle 469 is mounted to eject the atomized fuel-air mixture in the downstream direction and this fuel-air mixture is ignited by a spark plug 476. The flame and products of combustion flow out of the enclosure 469 through the large outlet opening 477 of the enclosure 468. The enclosure 468 serves to protect the burner flame against being blown out by the intake air and to create turbulence downstream from the burner in order to thoroughly mix the burner heat with the intake air in order to quickly start an engine.

Figure 20:
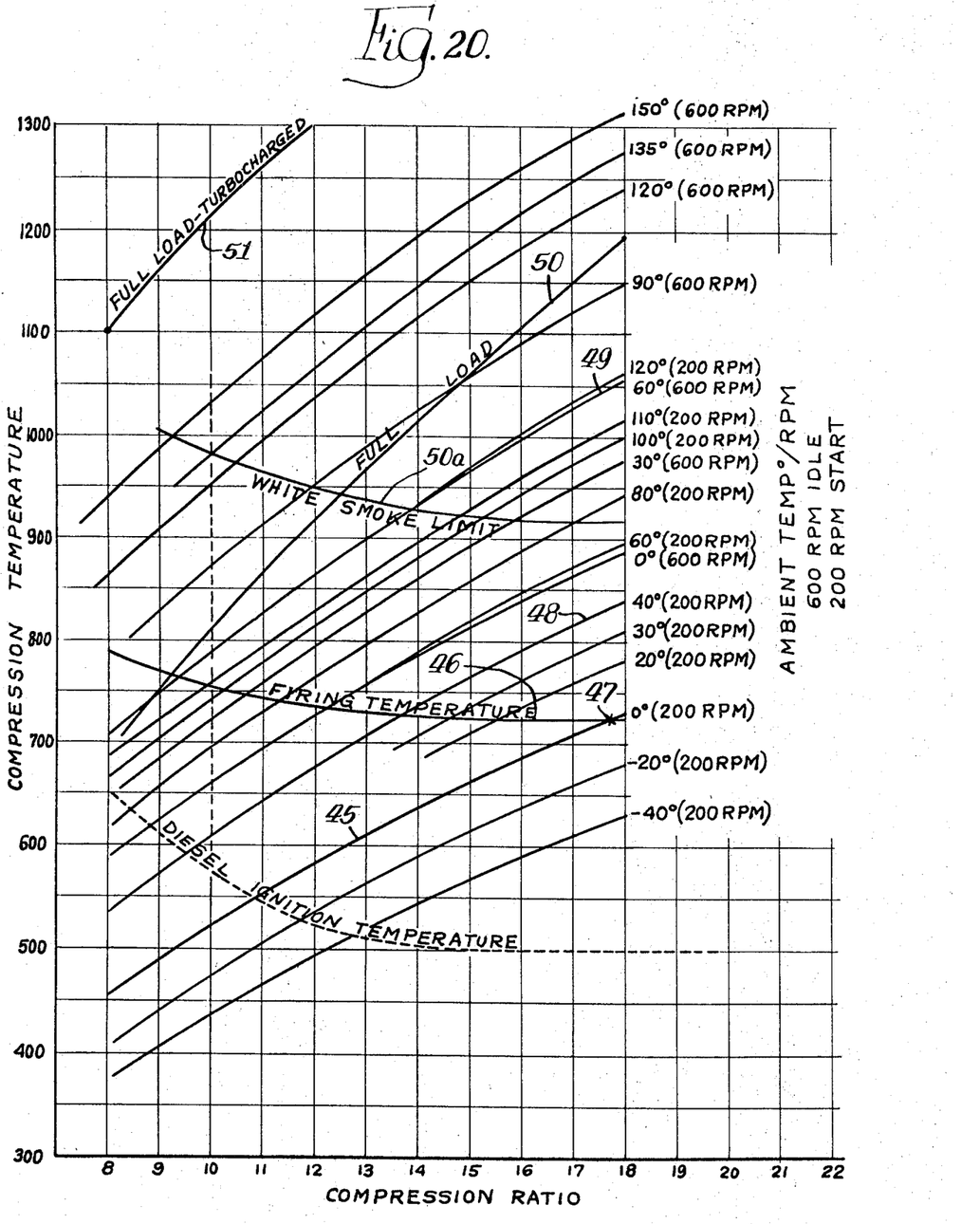
FIGS. 20 to 22 show curves illustrating the operation of an engine embodying the invention.

FIG. 20 illustrates operation of a compression-ignition type engine having a bore between 5 and 6 inches and with an ambient pressure of approximately 14.7 psia, such operation being shown as functions of the compression ratio of the engine and the compression temperature. The line 45 in FIG. 18 represents the compression temperature within the cylinders of the same engine but with various compression ratios when starting the engine with an ambient temperature of 0°F. After cranking, the compression temperature for such engine having a compression ratio of less than 12 to 1 will be less than 580°F., whereas the compression temperature after cranking of such engine having a compression ratio of 18 to 1 will be approximately 725°F. The line 46 in FIG. 20 represents the compression temperature which must be reached within a cylinder in order to sustain firing of a diesel-fuel and air mixture in an engine, and it can be seen that the ignition temperature is higher for engines having a relatively low compression ratio than it is for engines having a high compression ratio. For example, such engine having a compression ratio of less than 10 to 1 requires a firing temperature of at least 760°F. whereas such engine having a compression ratio of 18 to 1 must have a compression temperature of approximately 725°F. The two lines 45 and 46 intersect at the point 47 which corresponds to a compression ratio of approximately 17.6 to 1, and it will be apparent that a compression ratio of more than 17.6 to 1 is necessary for such engine to start after one minute of cranking time and an ambient temperature of 0°F., without the use of a starting aid.

The line 48 illustrates operation similar to that for the line 45 but with an ambient temperature of 40°F., and it can be seen that such an unaided engine with a compression ratio less than approximately 13.5 to 1 will not start at this ambient temperature.

The line 49 in FIG. 20 illustrates the operation of an unaided engine, when the engine is idling after a period of no load operation with an ambient temperature of 60°F. From this line it will be apparent that for all compression ratios greater than approximately 9.4 to 1, the compression temperature will be above that necessary for sustained firing. However, for compression ratios lower than approximately 9.4 to 1, the compression temperature falls below that necessary for sustained firing and the engine will stop running.

The line 50 illustrates the operation of such an unaided engine when operating under full load. It will be apparent that the compression temperatures with compression ratios down to approximately 9.2 to 1 will be sufficiently high to sustain firing.

By way of comparison, the line 51 illustrates the operation of a turbocharged engine of the same cylinder diameter, operating under full load, and a comparison of the lines 50 and 51 shows that the turbocharged engine runs considerably hotter than a similar engine without turbocharging.

The line 50a represents the upper temperature limit at which white smoke appears. At temperatures above the line 50a, white smoke will be eliminated while at temperatures below the line 50a white smoke will be present.

It can therefore be seen from the curves in FIG. 20 that, if the engine is built having a compression ratio less than approximately 12.0 to 1 and, further, is to start relatively rapidly with ambient temperatures as low as −20°F., is to idle smoothly at such temperatures, and is to operate without white smoke, a combustion aid should be provided. Further to attain high power output from such an engine, a high charge-density boost apparatus should be provided.

Figure 21:
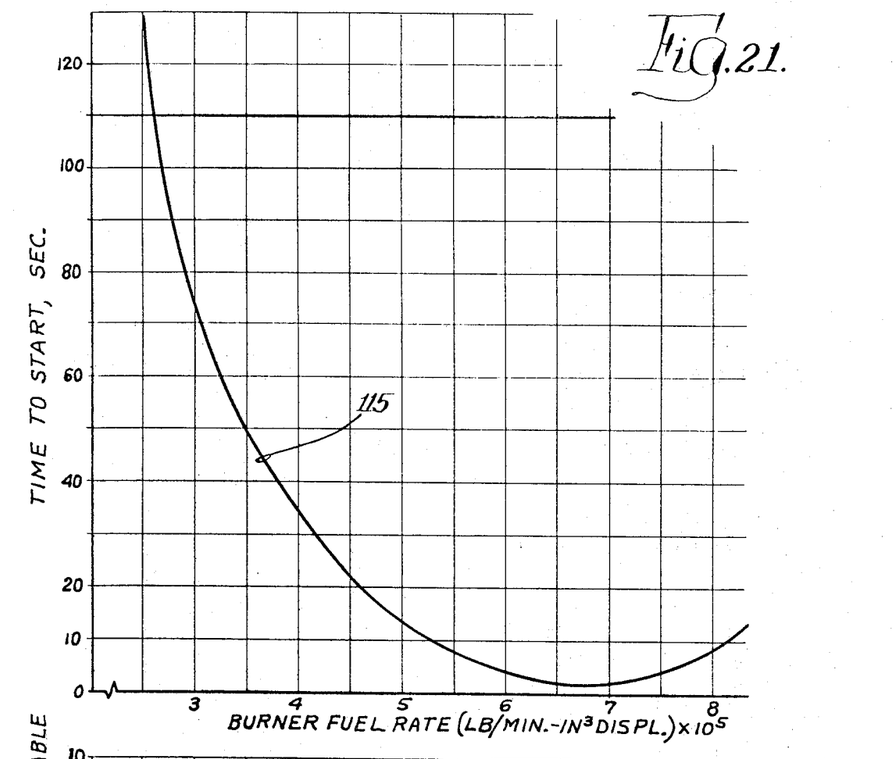

As shown in FIG. 21, it is also important that the proper amount of fuel be drawn through the fuel nozzle of the burner for optimum starting results. This amount also rapidly eliminates white smoke. The curve 115 is a plot of burner fuel flow rate as a function of the length of time required to start an engine, the curve 115 being based on data obtained from a four-stroke compression-ignition engine having a compression ratio of 12.1 to 1. Further, the engine was an in-line six cylinder engine having a cylinder bore of 5½ inches and a piston stroke of 6 inches. The ambient temperature was −15°F. to −27°F., and the higher heating value of the burner fuel was 19,820 BTU per pound of fuel. As shown by the curve 115, the optimum, or minimum, starting time occurs with a burner fuel flow rate of approximately .000067 pounds per minute of fuel per cubic inch displacement of the cylinders served by the burner. An air flow rate from the air nozzle of the burner of approximately 10 percent of the amount of intake air flowing through the manifold when starting the engine, provides this fuel flow rate. When more fuel than this amount is fed to the burner, an excessive amount of the oxygen in the intake air will be used up and the air may be excessively vitiated, and when the flow rate is more than approximately .000082 pounds per minute per cubic inch displacement, the starting time is very erratic and, in fact, the engine may fail to start. On the other hand when too little fuel is fed to the burner, the intake air may not be sufficiently heated. As shown by curve 115, the engine may not start when the fuel flow rate is less than approximately .000025 pounds per minute per cubic inch displacement. Thus, the fuel rate should be within the range of from approximately .000025 to approximately .000082 pounds per minute per cubic inch of engine displacement, for the engine to start. Further, military specifications require that an engine start in less than thirty seconds at −25°F., and therefore a more preferred fuel flow rate is between from approximately .000042 to .000082 pounds per minute per cubic inch displacement in order to meet military specifications. For optimum performance the rate is approximately .000067 pounds per minute per cubic inch displacement.

For a two-cycle engine, it is necessary to increase the fuel flow rate to compensate for the increased air flow. An equivalent optimum fuel flow rate for a two-cycle engine would be about .0001 pounds per minute per cubic inch of the cylinders served by the burner.

Figure 22:
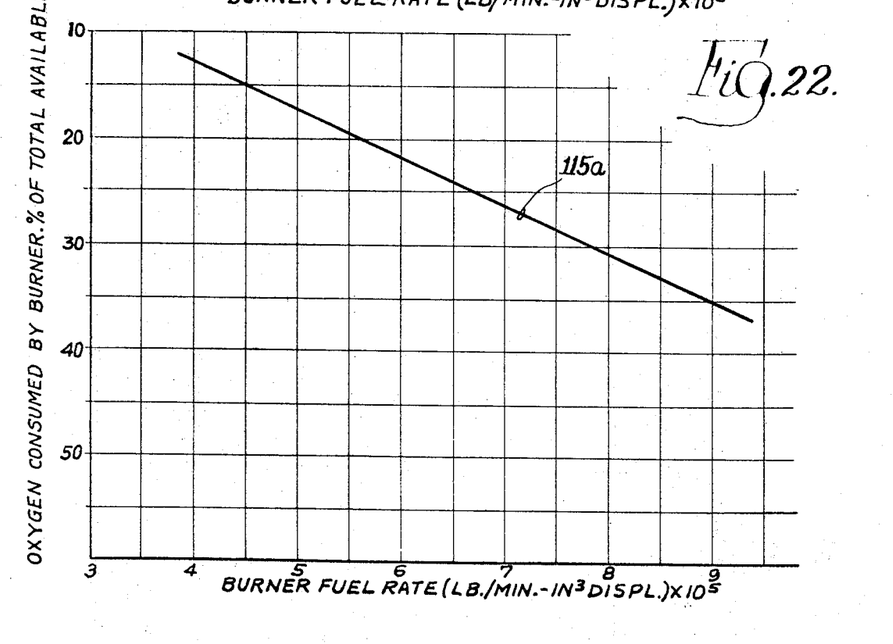

With reference to FIG. 22, the curve 115a illustrates the variation in the amount of oxygen in the intake air consumed by the burner, as a function of the fuel flow rate to the burner. Obviously, as more fuel is fed to the burner more oxygen in the intake air will be consumed. When the flow rate is .000082 pounds per minute per cubic inch displacement or more, over 31.5 percent of the oxygen in the intake air will be consumed, and the engine will be difficult to start perhaps because of insufficient oxygen in the cylinders. When the flow rate is .00004 pounds per minute per cubic inch displacement or less, there will be sufficient oxygen present in the intake air carried into the cylinders, but the other conditions required for quick starting may not be present. When the fuel flow rate is at the optimum value of .000067 pounds per minute per cubic inch displacement, approximately 25 percent of the oxygen in the intake air is consumed by the burner. A preferred range of fuel flow rate is from approximately .000033 to approximately .000082 pounds per minute per cubic inch engine displacement because, when the fuel flow rate is within this range, the engine will usually start within a cranking time of one minute or less. This is important because purchasers of engines to be installed in trucks are hesitant to buy an engine which may require a starting time of more than one minute. With manifold burners operating as described, an engine will start at a temperature which is approximately 85°F. lower than a similar engine without such burners.

While the fuel flow rates specified above are in terms of pounds of fuel, it should be understood that the primary consideration is the number of BTUs added and the amount of oxygen of the intake air consumed by the burner. Regardless of the type of fuel used, the optimum number of BTUs should be approximately 1.34 BTU per minute per cubic inch displacement, at which figure approximately 25 percent of the oxygen is consumed. When using diesel fuel having a higher heating value of 19,820 BTU per pound as mentioned previously, an optimum flow rate of .000067 pounds per minute per cubic inch displacement produces the optimum BTU input mentioned above.

From the foregoing, it will be apparent that the present invention contemplates preheating the intake air as delivered into each of the engine cylinders to a temperature sufficient to insure proper ignition and rapid elimination of white smoke under all expected ambient temperatures during starting and running and when the engine is designed for operation at a low compression ratio that is less than 12 to 1. This objective, not obtainable heretofore in engines adapted for use in commercial transport vehicles is achieved by the novel manner of distributing to each of the engine cylinders the heat resulting from the consumption of fuel within the intake manifold.

Thus, instead of spraying fuel directly into and burning the same in the entire manifold space as has been done heretofore, the burning and the flow of the products of the combustion is confined to a small cross-section of the manifold disposed close to the intake ports and extending along and across the latter, thus maintaining the maximum temperature of the stream until it becomes directed to the respective intake ports. The total heat output of the burner is thus distributed to the different cylinders with sufficient uniformity to insure rapid ignition and starting accompanied by the early disappearance of white smoke even through the intake air is supplied to the manifold at different distances from the intake ports of the different ones of the bank of cylinders.

The improved fuel burner used to preheat the air in the combustion aid burns fuel and intake air in amounts that do not excessively reduce the amount of intake air available in the cylinders of the engine during operation of the burner.

I claim:

1. In an internal combustion engine of the compression-ignition type having a plurality of cylinders, air intake ports leading to said cylinders, and air intake means for conducting intake air to said air intake ports, the combination comprising a fuel burner, distributing means in said air intake means for distributing hot gases from said burner to said ports, said fuel burner being mounted to direct flame therefrom toward said distributing means, said distributing means extending in said air intake means past at least one of said ports, said distributing means having inlet means located to receive hot gases from said burner, and said distributing means having outlet means at least adjacent more than one of said ports and distributing the hot gases from said burner to said ports.

2. In an internal combustion engine of the compression-ignition type having a plurality of cylinders, air intake ports leading to said cylinders, and air intake means for conducting intake air to said air intake ports, the combination comprising a fuel burner, distributing means in said air intake means for distributing hot gases from said burner to said ports, said fuel burner being mounted to direct flame therefrom toward said distributing means said distributing means extending in said air intake means past at least one of said ports, said distributing means having inlet means located to receive hot gases from said burner, and said distributing means having outlet means at least adjacent more than one of said ports and distributing the hot gases from said burner to said ports, said distributing means comprising a tube, said inlet means being an inlet opening formed at one end of said tube and said outlet means being formed in the side of said tube facing said air intake ports, whereby said hot gases flow through said tube and out said outlet means to said air intake ports.

3. The combination defined in claim 1 wherein said outlet means are sized and located relative to said ports to distribute the heat from said burner substantially equally to the respective cylinders.

4. The combination defined in claim 3 wherein said outlet means is in the form of outlet openings, and the areas of said outlet openings facing said air intake ports increase with increasing distance from said burner.

5. The combination defined in claim 3 wherein said distributing means is in the form of a tube, and said outlet means is in the form of a plurality of holes in the side of said tube facing said air intake ports, and the area of said holes per unit length of said tube increases with increasing distance from said burner.

6. The combination defined in claim 1 wherein said burner includes a fuel atomizing nozzle directed toward said inlet means, said combination also comprising aspirating means disposed between said nozzle and said inlet means for inducing air from the air intake means to flow into said inlet means.

7. The combination defined in claim 1 wherein said fuel burner includes a pair of nozzles mounted in said air intake means between two of said intake ports, said two nozzles being oriented to discharge fuel in opposite directions, and said distributing means comprises a pair of tubes, each of said tubes having one end disposed adjacent one of said nozzles and extending away therefrom in the direction of one of said two ports.

8. An internal combustion engine of the compression-ignition type comprising a plurality of cylinders, air intake ports leading to said cylinders, air intake means for conducting intake air to said air intake ports, a fuel burner, distributing means in said air intake means for distributing hot gases from said burner to said ports, said fuel burner being mounted to direct flame therefrom toward said distributing means, said distributing means extending in said air intake means past at least one of said ports, said distributing means having inlet means located to receive hot gases from said burner, and said distributing means having outlet means at least adjacent more than one of said ports and distributing the hot gases from said burner to said ports.

9. The combination as defined in claim 8, wherein said engine has a row of four of said air intake ports, said burner being located in said intake means between the middle two of said intake ports, and said distributing means includes a tube, said tube being in two sections, each extending past one of said middle two intake ports and toward one of the remaining intake ports, said burner being located to direct flame into each of said sections of said tube, and said outlet means of said tube being adjacent each of said four intake ports.

10. The engine as defined in claim 8, having a heat exchanger positioned in said air intake means upstream from said distributing means, the stream of intake air passing through said heat exchanger being in heat transfer relation therewith before said stream reaches said distributing means.

11. The engine as defined in claim 10, wherein said distributing means has a substantially closed surface facing said heat exchanger, said surface being disposed to limit the radiation of heat from said distributing means in the direction of said heat exchanger.